US005128414A

United States Patent [19]
Hwo

[11] Patent Number: 5,128,414
[45] Date of Patent: Jul. 7, 1992

[54] POLYMER PACKAGING FILM AND SHEET CAPABLE OF FORMING PEALABLE SEALS MADE FROM ETHYLENIC AND BUTENE-1 POLYMERS

[75] Inventor: Charles C. Hwo, Sugarland, Tex.

[73] Assignee: Shell Oil Company, Houston, Tex.

[21] Appl. No.: 666,935

[22] Filed: Mar. 11, 1991

Related U.S. Application Data

[60] Division of Ser. No. 50,648, May 18, 1987, abandoned, which is a continuation-in-part of Ser. No. 750,342, Jun. 28, 1985, abandoned.

[51] Int. Cl.$^5$ .............................................. C08L 23/20
[52] U.S. Cl. .................................... 525/240; 525/222; 525/227
[58] Field of Search .................... 525/240, 222, 227

[56] References Cited

U.S. PATENT DOCUMENTS

| 3,900,534 | 8/1975 | Schard. | |
|---|---|---|---|
| 4,075,290 | 2/1978 | Denzel et al. | |
| 4,188,350 | 2/1980 | Vicik et al. | 525/232 |
| 4,189,519 | 2/1980 | Ticknor | 428/476 |
| 4,335,224 | 6/1982 | Matsuura et al. | 525/240 |
| 4,336,212 | 6/1982 | Yoshimura et al. | 264/22 |
| 4,339,507 | 6/1982 | Kurtz et al. | 428/522 |
| 4,546,150 | 10/1985 | Shigemoto | 525/240 |
| 4,554,321 | 11/1985 | Hwo et al. | 525/240 |
| 4,665,130 | 5/1987 | Hwo | 525/222 |
| 4,701,496 | 10/1987 | Yoshimura et al. | 525/240 |

FOREIGN PATENT DOCUMENTS

| 0060037 | 9/1982 | European Pat. Off. . |
| 0076375 | 4/1983 | European Pat. Off. . |
| 1566077 | 4/1980 | United Kingdom . |
| 1582186 | 12/1980 | United Kingdom . |
| 2060658 | 5/1981 | United Kingdom . |

*Primary Examiner*—Christopher Henderson
*Attorney, Agent, or Firm*—James O. Okorafor

[57] ABSTRACT

Films or sheets are fabricated from blends of an ethylenic homopolymer or copolymer, a butene-1 copolymer, and a propylene homopolymer or copolymer which result in good peel seal characteristics, and wherein such films or sheets will bond to a polypropylene substrate in a laminar structure by extrusion lamination without the need for an adhesive.

3 Claims, No Drawings

POLYMER PACKAGING FILM AND SHEET CAPABLE OF FORMING PEALABLE SEALS MADE FROM ETHYLENIC AND BUTENE-1 POLYMERS This application is a divisional application of application Ser. No. 050,648, filed on May 18, 1987, now abandoned, which is a continuation-in-part application of application Ser. No. 750,342, filed Jun. 28, 1985, now abandoned.

BACKGROUND OF THE INVENTION

The present invention relates to a heat sealable wrapping or packaging film which is capable of forming a peelable seal. The seal is achievable either between two films of this kind, or between one film of this kind and polypropylene packaging film without the need for an adhesive between this film and the polypropylene.

A peelable seal is defined to be the seal or joint between two films produced by heat sealing or impulse sealing, the joint thus formed having the property of being able to open in the original plane of joining of the two films by the action of a pulling force, without wrenching off or tearing occurring in the material of the two films used to make up the joint. For the purposes of the present invention, the peelable seal must possess a mechanical resistance sufficient to maintain the wholeness and the tight-seal properties of the packaging and wrapping during storage and transport until such time as the packaging or wrapping is opened by the user of the article. The mechanical resistance of the peelable seal must be low enough to permit ready manual opening of the joint, i.e., without the use of any auxiliary instrument.

In the past, many varieties of thermoplastic materials have been employed in the manufacture of films capable of forming peelable seals. See, for example, U.S. Pat. No. 4,189,519, to American Can, which discloses a blend for producing a peelable heat seal comprising (1) about 50 to 90 percent by weight of a copolymer of about 80 to 96 percent by weight ethylene and about 4 to 20 percent by weight of an ethylenically unsaturated ester, and (2) about 10 to 50 percent by weight of a crystalline isotactic polybutylene. While capable of forming a peel seal, the film of '519 discloses polybutylene as a minor component. The blend of '519 bonds to high density polyethylene (HDPE) without the use of adhesive, but will not bond to polypropylene without an adhesive.

U.S. Pat. No. 3,900,534 to Mobil Oil Corporation discloses thermoplastic shrink films with good heat seal characteristics and good optical properties, however, '534 does not address the need for a peel seal film.

There has been a long felt need for a wrapping or packaging material having easy peelability at the seal and yet which will bond to polypropylene without the aid of an adhesive.

SUMMARY OF THE INVENTION

It has now been found that certain properties including heat seal strength, and peel seal characteristics of wrapping films or sheets may be improved by fabricating films or sheets from blends of (a) an ethylenic homopolymer or copolymer, (b) a high content butene-1 copolymer with a ethylene comonomer content of 1-15 mole percent, or with a propylene comonomer content of 5 to 30 mole percent, or with an alphaolefin comonomer content of 5 to 30 mole percent wherein the alpha olefin has 5-8 carbon atoms, and (c) a propylene homopolymer or copolymer. Such films or sheets may be bonded to a polypropylene substrate by extrusion lamination. Reference is made within this application to films but it should be kept in mind that sheets may be formed, as well.

In the present invention, the film comprises a mixture containing preferably about 25 percent by weight of an ethylenic homopolymer or copolymer (such as polyethylene or EVA), about 70 percent by weight of butene-1 copolymer with a comonomer content of from 1-30 mole percent depending on the comonomer selected for the desired result, and about 5 percent by weight of propylene homopolymer or copolymer. The mixture of polymers may range from about 10 percent by weight to about 45 percent by weight of the ethylenic homopolymer or copolymer, from about 50 percent by weight to about 85 percent by weight of the butene-1 copolymer and from about 3 percent by weight to about 15 percent by weight of the propylene homopolymer or copolymer.

DETAILED DESCRIPTION OF THE PREFERRED EMBODIMENT

Applicants have found that a wrappable film may be made which is capable of forming peel seals and comprises a mixture containing from about 10 percent by weight to about 40 percent by weight of an ethylenic homopolymer or copolymer, from about 50 percent by weight to about 85 percent by weight of a butene-1 copolymer with a certain comonomer having a content of from 1-30 mole percent, and from about 3 percent by weight to about 15 percent by weight propylene homopolymer or copolymer.

More preferably, the film composition comprises a mixture which contains from about 25 percent by weight to about 40 percent by weight of the ethylenic homopolymer or copolymer, from about 50 percent by weight to about 70 percent by weight of the butene-1 copolymer as described above, having an alpha olefin comonomer mole percent in the range of 1 to 30 mole percent, and from about 5 percent by weight to about 10 percent by weight of the propylene homopolymer or copolymer.

Most preferably, the film composition comprises a mixture which contains about 25 percent by weight of the ethylenic homopolymer or copolymer, about 70 percent by weight of the butene-1 copolymer, with the comonomer of the type and amount as described above, and about 5 percent by weight of the propylene homopolymer or copolymer.

The ethylenic homopolymer or copolymer may be linear low density polyethylene (LLDPE), low density polyethylene (LDPE), medium density polyethylene (MDPE), ethylene vinyl acetate copolymer (EVA), ethylene-methyl acrylate copolymer (EMA), or high density polyethylene (HDPE) and is most preferably low density polyethylene or ethylene vinyl acetate copolymer.

The propylene homopolymer or copolymer can be blended for improvement in the processability of the mixture. Almost any type of propylene copolymer can be used provided there is more propylene mole percent than the other comonomer mole percent in the copolymer.

The polymer mixtures may be formed into oriented or unoriented films by casting or film blowing methods.

After fabrication the film can be heat sealed by sealing jaws at a preset temperature, pressure and dwell. The seal strength is tested by an Instron tensile tester at 10"/min. crosshead speed. Maximum strength on a one inch width strip was designated as peel seal strength.

These manufacturing techniques apply to film, although this invention may also apply to sheeting. Film refers to shaped plastics that are comparatively thin and have a maximum thickness of 0.010 inches (10 mils). Sheeting is a shaped plastic having a thickness greater than 0.010 inches.

The present invention may also comprise the coating layer of a laminated structure which comprises polypropylene as the substrate. The peel seal coat, which consists of a mixture of high content polybutylene, polypropylene and either polyethylene or EVA, would be coated or laminated onto the substrate selected.

The laminate can be made by making two separate films that are then laminated. The lamination may be prepared from two separate films which were prefabricated by either film blowing (melt extrusion with a circular die) or the casting method (a flat die-melt extrusion process).

Melt extrusion with a flat die (casting) may be accomplished for thermoplastic polymers by using a flat die or slot die. The extrusion process starts with a polymer in a form that can be fed continuously into an extruder by means of a screw or pneumatic tube. Sometimes the polymers are combined with materials such as plasticizers, lubricants, stabilizers and colorants by means of Banbury mixers. The resulting mix is extruded through rod shaped dies and chipped into pellets. Pelletized polymer is fed into a screw conveyer into the end of a screw-type extruder and is heated and made into viscous fluid in a cylinder by means of a revolving, helical screw. The sheet emitting from the die is quenched on a temperature controlled chill roll. Finished films may be subject to a two-way stretching using continuous tenter-frame operations in biaxially orientation.

EXAMPLE 1

Cast Film

Polybutylene PB8240 having an ethylene comonomer content of 1 to 2 mole percent, a melt index of about 2 g/10 min. (ASTM method #D1238 condition E) and a density of about 0.910 was dry blended in a tumbler mixture with EVA (USI UE 632) and/or polypropylene (Shell PP5820). The resultant blends were extruded at a die temperature of about 420° F. into film of about 2.00 mils in thickness each using a flat die. Peel sample strength was tested. The films were laminated together in face to face contact, using 40 pounds per square inch of pressure and a dwell time of about 0.5 seconds. After the film was cooled, one inch wide strips were cut from the film at locations across its width for testing of their seal strengths. Physical properties are given for the various films in the table below.

TABLE 1

PEEL-SEAL STRENGTH OF CAST FILM FROM PB/EVA/PP BLENDS

| BLEND COMPOSITION | PEELABLE SEAL STRENGTH, G/IN WIDTH* SEALING TEMPERATURE, °C. | | | | |
|---|---|---|---|---|---|
| | 116 | 121 | 127 | 132 | 138 |
| 1. 25% EVA + 70% PB 8240 + 5% PP 5820 (Single Layer) | 188 | 363 | 272 | 410 | 699 |
| 2. 45% EVA + 50% PB 8240 + 5% PP 5820 (Single Layer) | 178 | 130 | 245 | 604 | 792 |
| 3. (25% EVA + 70% PB 8240 + 5% PP 5820)/PP (Laminated) | 372 | 493 | 385 | 455 | 618 |
| 4. (45% EVA + 50% PB 8240 + 5% PP 5820)/PP (Laminated) | 93 | 233 | 267 | 323 | 627 |

Note:
Film Thickness is 2 mils, Laminated film thickness is 4.5 mils/2 mils. Sealing Conditions: 0.5 Sec. Dwell, 40 psi, Two Sides Heated and One Side with Teflon Cloth.
EVA is USI UE 632 ethylene vinyl acetate copolymer at MI = 7.5, PB 8240 is Shell Polybutylene at MI = 2.0 or MF = 5.0, with an ethylene comonomer of 1 to 2 mole percent.
PP 5820 is Shell Polypropylene at MF = 12.0
Seal strength tested by an Instron tester at 10"/min.
*300 g/in = satisfactory peel seal As may be seen from Table 1, four different blend compositions were tested for seal strength in grams per inches at sealing temperatures of 116°, 121°, 127°, 132° and 138° C. A satisfactory peel seal value is 300 g/in or above. Formulations No. 2 and 4 (50% PB) exhibited seal strengths greater than 300 g/in at about 130° C. Formulation Nos. 1 and 3 (70% PB) exhibited seal strengths greater than 300 g/in at about 130° C. Peel seal strength was acceptable (greater) at a much lower sealing temperature for blends with 70% PB than blends with 50% PB.

In summary, it has been unexpectedly found by applicant that the mixture of about 5 percent of a propylene homopolymer or copolymer, about 50 to 70 percent butene-1 copolymer with an ethylene comonomer content of from about 1 to 2 mole percent and about 10 to 45 percent ethylenic homopolymer or copolymer results in a unique film which has good peel seal strength, good processability and will bond by extrusion lamination to a polypropylene substrate in a laminar structure without the need for an adhesive to achieve such bonding.

What is claimed is:

1. A packaging film or sheet which is capable of forming peel seals, comprising a mixture containing:
    about 25 percent by weight of an ethylene homopolymer or copolymer;
    about 70 percent by weight of a butene-1 copolymer with a propylene comonomer content of 5–30 mole percent; and
    about 5 percent by weight of a propylene homopolymer or copolymer.

2. The packaging film or sheet of claim 1, wherein said ethylene homopolymer or copolymer is selected from the group consisting of:
    linear low density polyethylene, low density polyethylene, medium density polyethylene, ethylene vinyl acetate copolymer, and high density polyethylene.

3. The packaging film or sheet of claim 1 which comprises an unoriented or oriented film or sheet.

* * * * *